Patented Mar. 10, 1936

2,033,316

UNITED STATES PATENT OFFICE 2,033,316

ACID DYESTUFFS OF THE ANTHRAQUINONE SERIES

Karl Zahn and Heinrich Koch, Frankfort-on-the-Main-Hochst, Germany, assignors to General Aniline Works, Inc., New York, N. Y., a corporation of Delaware No Drawing. Application May 9, 1935, Serial No. 20,705. In Germany May 19, 1934

5 Claims. (Cl. 260—60)

The present invention relates to acid wool-dyestuffs of the anthraquinone series.

We have found that new dyestuffs of good fastness properties are obtainable by causing an aminoaralkyl-alkyl-sulfone, for instance, of the following formula:

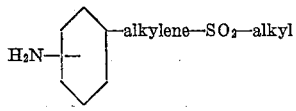

to react with a 1-amino-4-halogenanthraquinone-2-sulfonic acid. Hitherto, these sulfones have not been described and not been used. Their simplest representatives may easily be obtained by reaction of, for instance, nitrobenzylchlorides with alkyl-sulfinic acids and reduction of the products. The condensation of the 1-amino-4-halogenanthraquinone-2-sulfonic acids with the said sulfones takes place easily, it being surprising that the corresponding ortho-derivatives also undergo the said condensation in an easy manner.

The dyestuffs obtainable according to the present process are new. There are obtained, for instance, dyestuffs of the following formula:

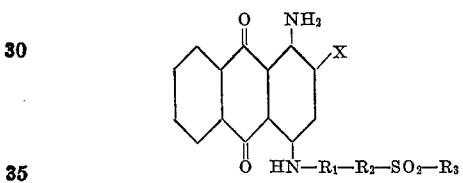

wherein
X means a sulfo group or a salt thereof,
$R_1$ an aryl radical of the benzene series,
$R_2$ a methylene or ethylene group and
$R_3$ an alkyl radical.

They are distinguished by a very good levelling power. It could not be expected that the sulfone group in the dyestuff molecule would bring about this levelling effect since it is not directly linked to the aryl nucleus. Considering that the simplest components used for the preparation of the present dyestuffs constitute side-chain substitution products of toluidines it is surprising that the new dyestuffs yield dyeings of a considerably enhanced evenness as compared with those obtainable with the corresponding toluidine dyestuffs.

According to the present invention there may be obtained, for instance, from 1-amino-4-bromanthraquinone-2-sulfonic acid by reaction with ortho-amino-benzyl-methyl-sulfone a dyestuff which yields on wool very vivid reddish blue tints and which, as regards its levelling power, surpasses the best commercial dyestuff of this shade. The present process, therefore, constitutes an industrial progress.

The following examples serve to illustrate the invention, but they are not intended to limit it thereto, the parts being by weight:

(1) 40 parts of 1-amino-4-bromanthraquinone-2-sodium sulfonate are heated for several hours at 65° C.–75° C. with 26 parts of ortho-aminobenzylmethylsulfone of the formula:

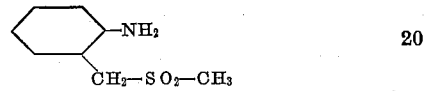

in 180 parts of water in the presence of 4 parts of sodium carbonate, 20 parts of sodium bicarbonate and 1 part of cuprous chloride until the formation of the dyestuff is finished. On cooling, the sodium salt of the dyestuff separates in the form of coarse crystals. It is filtered with suction and washed with dilute sodium chloride solution. In the dry state, the dyestuff forms a blue powder which dyes wool from an acid bath clear reddish blue tints of very good evenness. It has the following constitution:

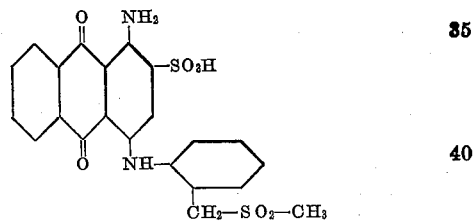

Ortho-aminobenzyl-methylsulfone used for the condensation may be prepared as follows: 34 parts of ortho-nitrobenzylchloride are heated to boiling for several hours with 25 parts of methan-sodium sulfinate in 150 parts of methanol. After cooling, the crystalline magma is filtered with suction and washed free from sodium chloride by means of water. Ortho-nitrobenzyl-methylsulfone melts at 121° C. By reduction, ortho-aminobenzyl-methylsulfone is obtained which melts at 117° C.–118° C.

(2) By replacing in Example 1, 26 parts of ortho-aminobenzyl-methylsulfone by 26 parts of meta-aminobenzyl-methylsulfone and proceeding as indicated in this example, a blue dyestuff is obtained which dyes wool from an acid bath clear blue tints and has the following constitution:

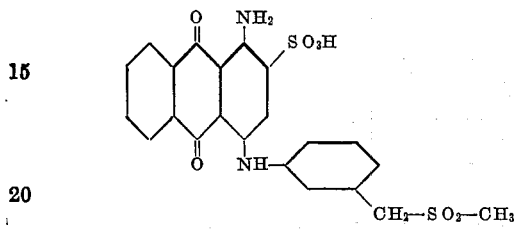

The meta-aminobenzyl-methylsulfone used for the condensation may be obtained from meta-nitrobenzylchloride as described in Example 1. Meta-nitrobenzyl-methylsulfone melts at 121° C. Meta-aminobenzyl-methylsulfone melts at 126° C.

(3) 40 parts of 1-amino-4-bromanthraquinone-2-sodium sulfonate are heated to gentle boiling with 24 parts of para-aminobenzyl-methylsulfone in 140 parts of water and 100 parts of alcohol in the presence of 4 parts of sodium carbonate, 20 parts of sodium bicarbonate and 1 part of cuprous chloride until the formation of the dyestuff is finished. The dyestuff may be purified in the usual manner. In the dry state it forms a blue powder which dyes wool from an acid bath clear blue tints.

The para-aminobenzyl-methylsulfone used may be prepared from para-nitrobenzylchloride in the manner described in Example 1. Para-nitrobenzyl-methylsulfone melts at 171° C.–172° C., para-aminobenzyl-methylsulfone melts at 170° C.

(4) By replacing in Example 1, 26 parts of ortho-aminobenzyl-methylsulfone by 30 parts of ortho-aminobenzyl-ethylsulfone and carrying out the condensation at 75° C. to 85° C. as indicated in this example, a blue dyestuff is obtained which dyes wool clear reddish blue tints.

The ortho-aminobenzyl-ethylsulfone used for the condensation may be obtained in the following manner: A mixture of 34 parts of ortho-nitrobenzylchloride, 28 parts of the sodium salt of ethane-sulfinic acid and 150 parts of methanol is heated to boiling for several hours. The crystalline magma is filtered by suction and washed free from sodium chloride by means of water. The ortho-nitrobenzyl-ethylsulfone melts at 84° C. to 85° C., the ortho-aminobenzyl-ethylsulfone melts at 113° C.

By using instead of ortho-aminobenzyl-ethylsulfone the corresponding compound in which the ethyl group is replaced by another alkyl group as, for instance, propyl, a similar dyestuff is obtained.

(5) A dyestuff of similar properties is obtained by replacing in Example 1, 26 parts of ortho-aminobenzyl-methylsulfone by 30 parts of meta-aminobenzyl-ethylsulfone melting at 105° C. The dyestuff dyes wool from an acid bath clear blue tints of good evenness.

(6) By using in Example 1 for the condensation instead of 26 parts of ortho-aminobenzyl-methylsulfone, 30 parts of para-aminobenzyl-ethylsulfone, a blue dyestuff is obtained which dyes wool clear blue tints.

The para-aminobenzyl-ethylsulfone used for the condensation may be prepared from para-nitrobenzylchloride in the manner described in Example 4. Para-nitrobenzyl-ethylsulfone melts at 133° C. to 134° C., para-aminobenzyl-ethylsulfone melts at 113° C. to 115° C.

(7) A mixture of 40 parts of the sodium salt of 1-amino-4-bromoanthraquinone-2-sulfonic acid, 28 parts of 1-(methylsulfonyl)-2-(4'-aminophenyl)-ethane, 120 parts of water, 4 parts of sodium carbonate, 20 parts of sodium bicarbonate and 1 part of cuprous chloride is heated at 70° C. to 85° C. for several hours, until the formation of dyestuff is finished. The product is worked up in the usual manner. A blue dyestuff is obtained which dyes wool from an acid bath clear greenish blue tints.

A similar dyestuff is obtained by using for the reaction instead of 28 parts of 1-(methylsulfonyl)-2-(4'-aminophenyl)ethane, 28 parts of 1-(ethylsulfonyl)-2-(4'-aminophenyl)ethane.

The 1-(methylsulfonyl)-2-(4'-aminophenyl)-ethane used may be prepared from 1-bromo-2-(4'-nitrophenyl)-ethane in the manner described in Example 1. 1-(methylsulfonyl)-2-(4'-nitrophenyl)-ethane melts at 142° C.–143° C.; 1-(methylsulfonyl)-2-(4'-aminophenyl)-ethane melts at 98° C.–99° C.; 1-(ethylsulfonyl)-2-(4'-nitrophenyl)-ethane melts at 65° C.; 1-(ethylsulfonyl)-2-(4'-aminophenyl)-ethane melts at 86° C.–87° C.

(8) A mixture of 40 parts of the sodium salt of 1-amino-4-bromanthraquinone-2-sulfonic acid, 28 parts of 3-amino-4-methoxybenzylmethyl-sulfone, 200 parts of water, 4 parts of sodium carbonate, 20 parts of sodium bicarbonate and 1 part of cuprous chloride is heated for 4 to 5 hours at 65° C. to 80° C. The sodium salt of the dyestuff which has separated in the form of coarse blue green crystals is filtered by suction and washed with dilute sodium chloride solution. In the dry state, the dyestuff forms a blue powder which dyes wool from an acid bath clear blue tints of good evenness.

The 3-amino-4-methoxybenzylmethylsulfone used for the condensation may be prepared from 3-nitro-4-methoxybenzylchloride in the manner described in Example 1. 3-nitro-4-methoxybenzyl-methylsulfone melts at 158° C.–159° C., 3-amino-4-methoxybenzyl-methylsulfone melts at 90° C.–91° C.

(9) By replacing in Example 8, 28 parts of 3-amino-4-methoxy-benzylmethylsulfone by 28 parts of 3-amino-6-methoxybenzyl-ethylsulfone and carrying out the condensation at 70° C.–75° C., a dyestuff is obtained which dyes wool from an acid bath clear blue tints.

The 3-amino-6-methoxybenzylethylsulfone used for the condensation may be prepared from 3-nitro-6-methoxybenzylchloride in the manner described in Example 4. 3-nitro-6-methoxy-benzylethylsulfone melts at 139° C.–140° C., 3-amino-6-methoxybenzylethylsulfone melts at 143° C.

(10) By replacing in Example 8, 28 parts of 3-amino-4-methoxybenzylmethylsulfone by 28 parts of 3-amino-6-methoxy-benzylmethylsulfone and heating for several hours at 70° C. to 85° C., a blue dyestuff is obtained which dyes wool from an acid bath clear greenish blue tints of good evenness. It has the following constitution:

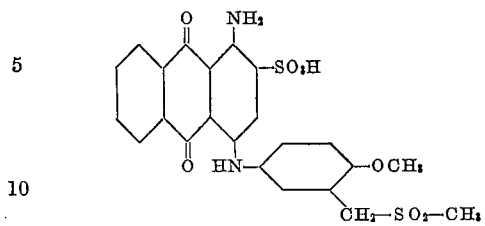

The 3-amino-6-methoxybenzylmethylsulfone used for the condensation may be prepared from 3-nitro-6-methoxybenzylchloride in the manner described in Example 1. 3-nitro-6-methoxybenzylmethylsulfone melts at 110° C.–111° C., 3-amino-6-methoxybenzylmethylsulfone melts at 102° C.–103° C.

We claim:
1. The compounds of the general formula:

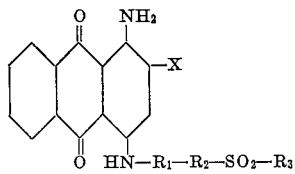

wherein X means a sulfo group or a salt thereof, $R_1$ an aryl radical of the benzene series, $R_2$ a methylene or ethylene group and $R_3$ an alkyl radical, said compounds being acid dyestuffs dyeing wool clear blue tints.

2. The compounds of the general formula:

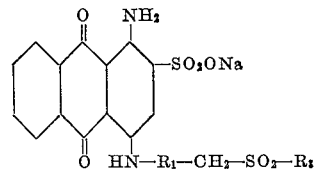

wherein $R_1$ means an aryl radical of the benzene series, and $R_3$ methyl or ethyl, said compounds being acid dyestuffs dyeing wool clear blue tints.

3. The compound of the formula:

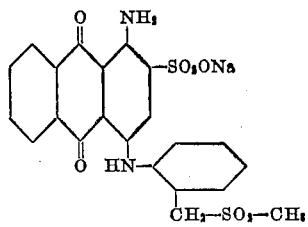

being a blue powder which dyes wool from an acid bath clear reddish blue tints of very good evenness.

4. The compound of the formula:

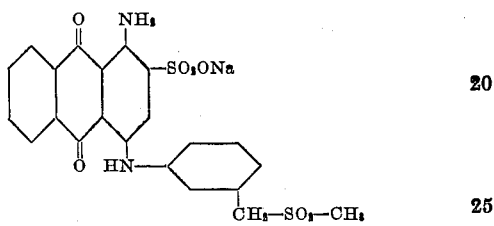

being a blue dyestuff which dyes wool from an acid bath clear blue tints.

5. The compound of the formula:

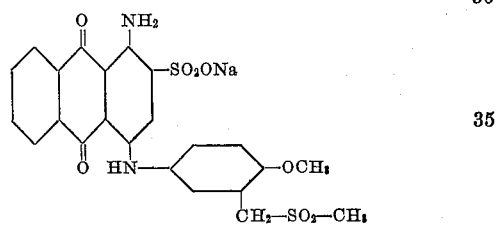

being a blue dyestuff which dyes wool from an acid bath clear greenish blue tints of good evenness.

KARL ZAHN.
HEINRICH KOCH.